Jan. 25, 1938.  C. F. LICK  2,106,354
SAFETY DEVICE FOR MOTION PICTURE PROJECTING MACHINES
Filed Feb. 28, 1934  3 Sheets-Sheet 1
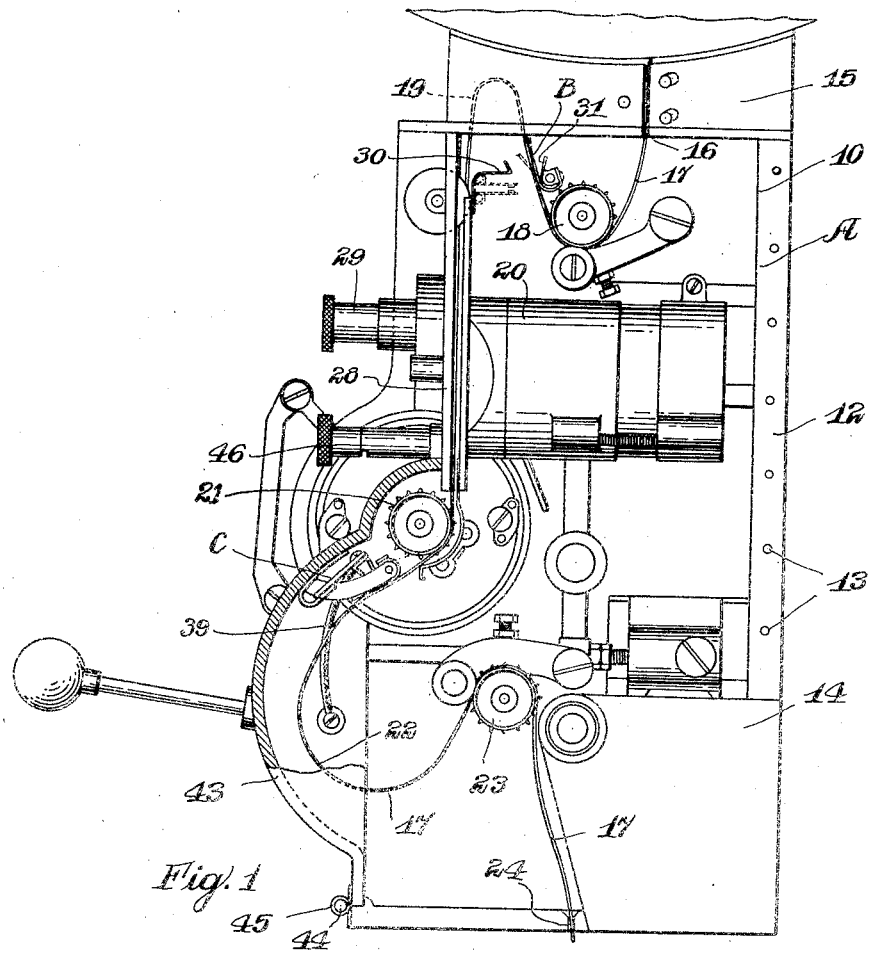
Fig. 1
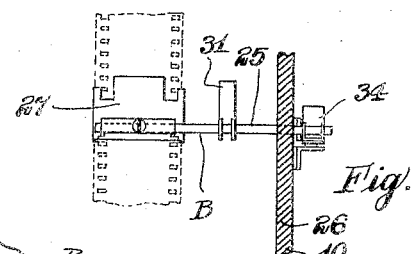
Fig. 2
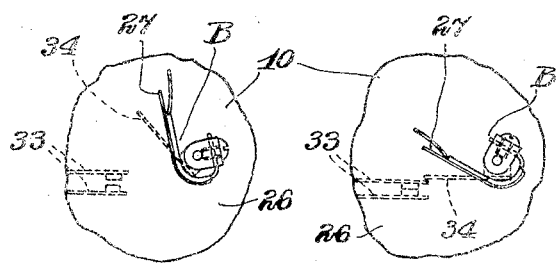
Fig. 3  Fig. 4
Inventor
Carl F. Lick
Attorney Jan. 25, 1938. C. F. LICK 2,106,354
SAFETY DEVICE FOR MOTION PICTURE PROJECTING MACHINES
Filed Feb. 28, 1934 3 Sheets-Sheet 2
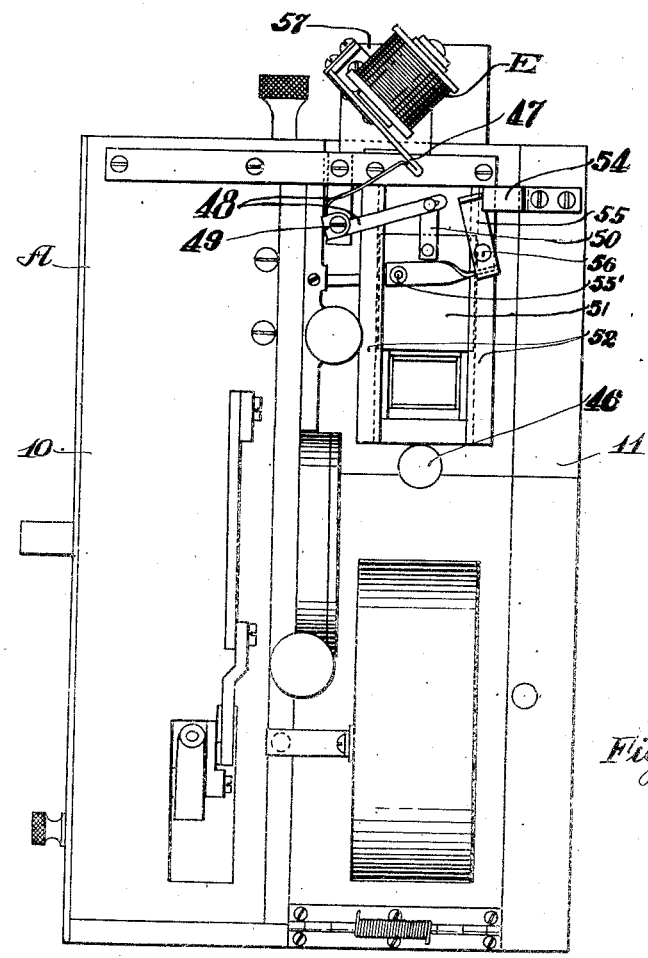
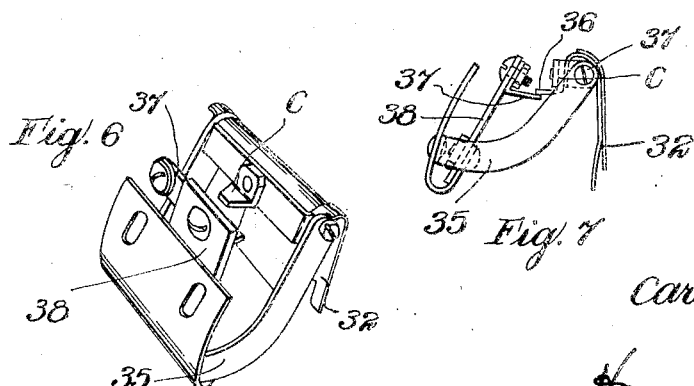
Inventor
Carl F. Lick
By Howard F. Fischer
Attorney Jan. 25, 1938.　　　　C. F. LICK　　　　2,106,354
SAFETY DEVICE FOR MOTION PICTURE PROJECTING MACHINES
Filed Feb. 28, 1934　　　3 Sheets-Sheet 3

Inventor
Carl F. Lick
By Howard Fischer
Attorney

Patented Jan. 25, 1938

2,106,354

UNITED STATES PATENT OFFICE 2,106,354

SAFETY DEVICE FOR MOTION PICTURE PROJECTING MACHINES

Carl F. Lick, St. Paul, Minn.

Application February 28, 1934, Serial No. 713,284

6 Claims. (Cl. 88—17)

In the operation of motion picture projecting machines it is highly important that safety be provided not only for the theater but for the operator, as well as instant controlling means. My device provides a simple, inexpensive means of preventing the destruction of the film by fire and also virtually instantly overcomes packing of the film in the projector.

An important feature of this invention resides in the use of film controlling aprons or shoes which ride on the film closely adjacent the film sprockets to give a quicker and better controlling means than has been provided heretofore. I provide a fire shutter which is so arranged that a slight electrical impulse will act to drop the same instantly as soon as an electric contact is closed which is associated with or a part of the film apron or shoe.

Heretofore heavy rollers or pins which are adapted to bear against the film have been used to actuate fire guards and other controlling devices, whereas, in my device I use a very lightweight film contacting apron or shoe. These aprons or shoes bear so lightly on the film that there is virtually no friction caused by them and the film moves through the machine as easily as before my device was applied.

A further feature of my controlling device is that it may be applied to a motion picture projector very easily without changing the structure of the projector, as the parts are designed to fit in the respective positions in and associated with the standard projectors now in use.

My controlling device may be used to shut off the projector or operate a change-over device between projectors so that if the fire guard operates to close the shutter the adjacent machine will start to show the next reel of the film as well as operating to prevent piling of the film in the projector.

A feature resides in a simple control which does not require extensive or dangerous electric wiring which might cause arcing, making a fire hazard, but which is designed to operate any part of the machine through mercury switches or other similar safety devices to insure the best operation of the projector.

Further, my device is designed so that the projector is virtually as accessible to the threading of the film as before the device was applied. A still further feature resides in providing means for automatically resetting the shutter when the operator's door of the projecting machine is opened so that the fire or safety shutter is automatically reset and holding the shutter against release while the door is open.

With these features I accomplish a better control and provide an advance in the art of safety and control means for motion picture devices over the prior art and my Patent No. 1,502,434.

In the drawings I have disclosed a means of carrying out my safety device for motion picture projecting machines and in which:

Figure 1 is a side elevation of a conventional motion picture projecting machine with the elements constituting my invention associated therewith, one side of the same being removed to disclose the inner parts of the projector.

Figure 2 is a detail partly in section of a portion of the device.

Figure 3 is a detail of a portion of the device.

Figure 4 is a detail of a portion of the device.

Figure 5 is a front elevation of the projector looking toward the cut-off shutter device which intercepts the beam of light to prevent fire.

Figure 6 is a perspective detail of a portion of the device.

Figure 7 is a side elevation of the parts illustrated in Figure 6.

Figure 8:
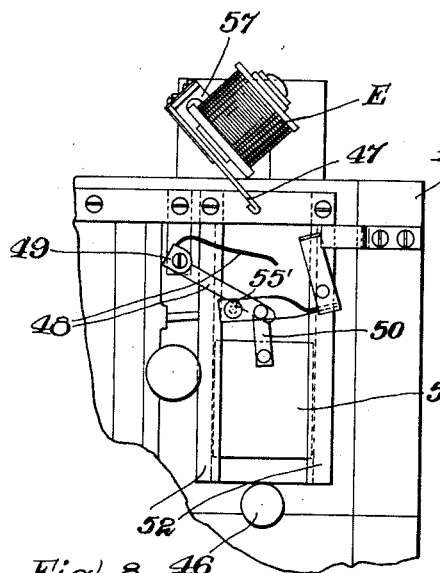
Figure 8 is a detail of a portion of the device, showing the fire shutter released into closed position.

The conventional projector A is illustrated with a casing 10 which incloses the working parts of the projector to separate them from the reel housings. The casing is provided with an operator's door 11 which is illustrated in Figure 5 and which is shown removed in Figure 1. The door 11 is hinged along the side 12, and the hinge, not shown, of which is attached in a suitable manner in the openings 13 along the side 12. The lower portion of the casing 10 on the side on which the door 11 is hinged is closed by the bracket segment 14.

The housing for the upper reel of the film is adapted to rest into the bracket 15 on top of the projector A and a film slot 16 leads the film 17 into the projector so that it may be engaged by the sprocket 18 to draw a film from the upper reel housing into the projector.

The film 17 is threaded into the projector around the sprocket wheel 18. The film passes from the sprocket 18 under the upper control apron or shoe mechanism B, then extends up to form the upper loop 19, then passes downwardly and is threaded between the usual aperture plate and the spring controlled horizontally slidable gate 20, and is then engaged by the intermittent film sprocket 21. From the sprocket 21 the film 17 passes under the lower control apron or shoe mechanism C and forms the loop 22. From the loop 22 the film passes over the lower driven sprocket 23 from which it passes downwardly through the slot 24 to the lower reel housing not illustrated.

The upper control mechanism B is mounted upon the shaft 25 which in turn is secured to the inner wall 26 of the housing or casing 10. The mechanism B includes the very light-weight apron 27 which is pivotally mounted upon the outer end of the shaft 25 and which is adapted to normally ride very lightly against the surface of the loop 19 of the film 17, as illustrated in Figure 1. In threading the film under the sprocket 18 and under the mechanism B and between the apertured plate 28 and the horizontally slidable gate 20, the knob 29 is pushed inward to slide the gate 20 back away from the plate 28 and in the act of doing this the bracket 30 carried by an upwardly extending portion of the gate 20 engages against the bracket arm 31 to raise the apron 27 into the position illustrated in Figure 1. The arm 31 is mounted upon the shaft 25. This provides an easy means of threading the film 17 under the mechanism B while the mechanism B is held up so that the loop 19 of the film may be passed under the same. The operator then releases the button 29 and the film is threaded under the sprocket 21 and is readily threaded under the apron 32 of the lower control mechanism C. This makes the threading of the film easy for the operator in forming the loop 22 and threading the film over the sprocket 23 and out of the slot 24, while the door 11 of the casing 10 is open.

The controlling mechanism B which is mounted on the wall 26 of the casing as illustrated in Figures 1 and 2, provides a construction where the shaft 25 projects through the wall and electrical contacts 33 are adapted to be closed by the arm 34 which is mounted upon the outer end of the shaft 25. Normally the contacts 33 are separated as illustrated in Figure 3, and the apron 27 rides upon the loop 19 which holds the apron in upward position, as illustrated in Figures 1 and 3. Should the loop 19 disappear either by the breaking of the film 17, the drawing of it taut, or for any other reason, the apron 27 will immediately fall into the position illustrated in Figure 4, causing the arm 34 to strike against the upper contact 33, bringing these two contacts together to close an electric circuit. The control mechanism B is in a form which is very desirable because the electrical contacts 33 are outside of the casing 10 and the inner end of the shaft 25 is suspended projecting from the wall 26 so that the film may be threaded practically as easily as if the mechanism B were not present. This is important to the operator.

Figure 12:
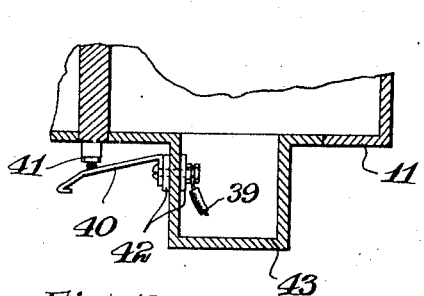
Figure 12 is a sectional detail of a portion of the device.

The controlling mechanism C employs an apron 32 which is similar to the apron 27 but which is mounted by the bracket 35 inside the casing 10, as illustrated in Figure 1. Figures 6 and 7 illustrate the bracket and mechanism C removed. The apron 32 is grounded to the bracket 35 and carries a contact lug 36 adjacent the pivot point 37 and normally the contact lug 36 is held out of contact with a contact 37 while the apron 32 is riding on the loop 22. The contact 37 is carried by an insulating arm 38 which in turn is fastened to the bracket 35. Thus when the loop 22 disappears sufficiently to drop the apron 32 the contacts 36 and 37 close a circuit. The contact 37 is connected by the wire 39, Figure 1, with the outside spring contact arm 40, Figure 12, which connects with the contact 41 which is insulated from the casing 10. The contact arm 40 is insulated by the insulating material 42 from the casing 10.

The casing 10 is provided with an outwardly curved hinged door 43 which is pivotally secured at 44 and is urged toward closing position by a spring 45. A locking button 46 holds the free end of the door 43 normally closed. In some cases the operator of the projector similar to A, disconnects the lower end from the hinge 44 owing to the closeness of the projector to the lamp hood so that the door 43 may be slid in the direction of the door 11 to remove the same. For this reason I have provided the spring contact 40 which operates to slidably engage with the contact 41 as well as making a contact if the door 43 is hinged outwardly away from the projector A. The contact arm 40 is carried by the door 43 and so is the bracket 35 which supports the control mechanism C. Thus the control mechanism C may be removed at any time in its entirety with the removal of the door 43.

Figure 9:
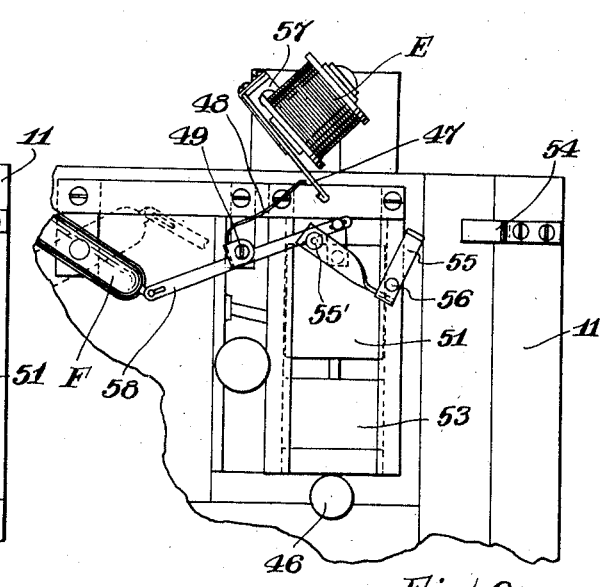
Figure 9 is a similar view to Figure 8, showing the operator's door partially open to show the automatic resetting into open position of the fire shutter, and an auxiliary control mercury switch.

The control mechanisms B and C are adapted to control the operation of the magnet E. The magnet E is formed with a latching arm 47 which engages with the bell crank 48 to normally hold the same in the position illustrated in Figure 5. The bell crank 48 is pivotally supported at 49 and one end of the arm 48 connects with the link 50 which carries the slidable fire shutter 51. When the magnet E is operated by either of the control mechanisms B or C, the fire shutter 51 is released by the operation of the arm 47 being drawn toward the magnet, thus instantly closing the shutter 51 into the position illustrated in Figure 8. The shutter 51 is slidably supported in the guides 52 and is adapted to close the light opening 53 upon being released by the magnet E. I provide means for automatically resetting the shutter 51 by the opening of the door 11. This includes a fixed lug 54 mounted upon the upper end of the door 11 as illustrated in Figures 5, 8 and 9, which normally contacts with one end of the bell crank lever 55 when the door 11 is closed. The lever 55 is pivotally mounted at 56 and the end 55′ extends to engage with one end of the arm 48 to raise the shutter when the door 11 is opened. The lever 55 is spring urged toward the lug 54 so that the moment the lug 54 disengages from the arm 55 the arm 55 tends to move to elevate the shutter 51 from the closed position illustrated in Figure 8, automatically raising it into the position illustrated in Figure 9 as the door 11 is opened. When the door 11 is again closed the lug 54 engages the arm 55, pressing it back into the position illustrated in Figure 8. However, by that time, the lever 48 has been elevated into the dotted position illustrated in Figure 9 and the magnet latch arm 47 holds the same with the shutter 51 in open position. In this manner I provide means for automatically setting the fire shutter 51 into open position upon the opening of the door 11.

Figure 10:
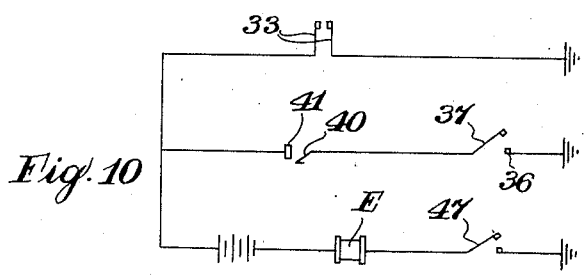
Figure 10 is a schematic wiring diagram.

In Figure 10 I have illustrated a wiring circuit which shows the contacts 33, 36 and 37, and the magnet E, together with the contacts 40 and 41. This circuit shows the grounding of one side of the line and diagrammatically illustrates the arrangement of the circuit.

The circuit also shows that the arm 47 operates with the lever 48 to break the ground connection to the magnet E when the lever 48 is in certain positions. This is important because it is undesirable to have the circuit closed to the magnet E after the fire shutter has been released into the position illustrated in Figure 8. The arm 47 is insulated on its mounting 57 whereas the lever 48 is grounded as illustrated. When the lever 48 is in the dotted position with its free end connecting with the latch 47, the circuit is closed. When the lever 48 is in the position illustrated in Figure 8 the circuit is open and when the door 11 is opened as illustrated in Figure 9, the circuit is also opened because the lever 55 raises the lever 48 out of contact with the arm 47 as illustrated in Figure 9.

Figure 11:
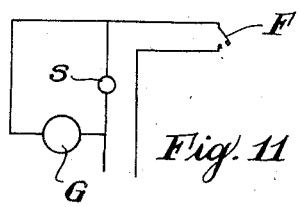
Figure 11 is a schematic wiring diagram.

The lever 48 may be provided with an extension arm 58 which is adapted to tilt a mercury control switch F. The switch F may be employed to operate the motor G which may be the motor for operating the projector A so that when the fire shutter 51 is operated to close the same the motor G which operates the projector A will instantly stop. In this same circuit with the switch F illustrated in Figure 11, I have illustrated a signalling device S which may be to signal the operator. It is obvious that the switch F or a series of similar switches may be employed because of their closed circuit with safety to operate changeover devices or any other suitable mechanism in conjunction with the operation of the control mechanisms B and C and the operation of the projector A.

The operation of the controls B and C is automatic so that if for any reason the loops 19 or 22 change or disappear, so as to speak, by reason of breaking of the film 17 or tightening of the same within the projector, the controls will instantly operate the fire shutter 51 to close it, preventing ignition of the film 17. These dual automatic controls also stop the operation of the projector virtually instantly by stopping the motor G which operates the same. An alarm or signal, such as S, can be operated with the operation of the controls B or C.

It is an important feature that the aprons which contact with the loops of the film 17 are very light-weight, and thus are sensitive in operation to changes which should be registered by the controls. The absence of film at the point of the controls causes them to instantly operate and where a switch or several switches such as F are used, circuits may be operated to set into operation other projectors not illustrated, and even though one switch F is shown, it is obvious that several may be operated in the manner illustrated.

It is also a feature that my control mechanism is adaptable to all well known types of projectors. While I have illustrated particular forms of controls and an adaptation of the same in a certain manner, it is obvious that the principles of these controls may be carried out by other means and applied to uses other than those above set forth.

It is also important in my projector control that the shutter 51 is reset automatically and instantly by the opening of the operator's inspection door 11, also that the circuit is opened by the opening of the door 43. These features permit the operator to work just as freely with the film in the projector A with absolute safety as is possible without my control device attached thereto. This makes my device more desirable because it is simple, efficient, and practical for the desired purposes. My control also has the advantage of being particularly adapted to projectors owing to the intermittent operation of the film past the light opening, and accomplishes a safety means which I believe has been overlooked heretofore in prior devices, so as to give instant control from either and both loops of the film in the projector.

To obtain absolute control in the projector it is essential that a dual control be provided to be effective with either one loop or the other, or upon both loops. This I have accomplished in my control as I have set forth and the prior art has failed to accomplish this. The most sensitive means of controlling a film through the projector is through the loops above and below the light gate. Virtually any trouble at all will be registered by the disappearance or diminishing of either or both of the loops. For this reason my control is more desirable and gives absolute instant control. If the lower loop diminishes or disappears the lower control C instantly operates to close the shutter, stop the projector, and advise the operator. If the upper loop diminishes or disappears, the upper control B instantly operates to close the shutter and accomplishes the same results as the lower control. Thus a projector equipped with my control means cannot be packed with film and the film cannot be ignited by the light or other means while the projector is closed. More controls, such as B and C, may be provided if it is desired. In the prior art where controls have been located below the lower take-up sprocket, such as 23, the failure of the sprocket 21 to draw the film past the apertured plate causes a failure to close the fire door and the result is that the film may be ignited before the control operates because of the surplus of film in the loop 22 and the standing still of the film at the light aperture. These failures are entirely eliminated in my control means.

A switch F may be employed co-operating with the arm 58 to totally shut off the projector, including the shutting off of the motor, the source of light, the sound switches, and change-over devices, so that my control is adapted to instantly totally shut off the projecting means and its associated equipment. In this case where the light source is shut off, it is not necessary to employ a fire shutter.

I claim:

1. A safety device for motion picture projecting machines in combination with a projector operating with a pair of film loops on either side of the light gate, and a film movable in one direction, controlling means continuously slidable on the film and operable by said loops to shut off the light rays from the film in the projector by a change in character of the film loops and means pivotally supporting said controlling means at the end thereof first contacted by the film in its travel.

2. The combination of, a motion picture projector, an inspection door therein, means for carrying a film through said projector and maintaining a pair of loops, a light shutter, means for normally holding said shutter open, means for instantly closing said shutter controlled by either of said film loops, and means operable by the opening of said inspection door to reopen said shutter.

3. A safety device for motion picture projecting machines in combination with a film movable in one direction including, a pair of film engaging aprons adapted to be controlled by the film loops in the projector, means pivotally supporting said apron at the end first contacting the film in its travel, electrical switch means operated by said aprons, a fire shutter for the light aperture of the projector, means for normally holding said shutter in open position, and electrical means for releasing said shutter controlled by said switch means operated by said aprons.

4. A safety device for motion picture projecting machines including, electrical switch means associated with the film loops in the projector, said switch means including a slidable film riding apron bearing a contact, and a fixed complemental contact, a light shutter, means for normally holding said shutter open, electrical means controlled by said switch means for automatically closing said light shutter virtually instantly upon the stopping of the film for any period longer than the intermittent operation of the film past the light opening.

5. The combination of, a motion picture projecting machine including, top feed film means, lower take-up means, a light gate, an apertured plate, a shutter associated with the aperture in said plate to shut off the same, means for normally holding said shutter open, means for automatically resetting said shutter by the opening of the inspection door of said projector, and electrical means adapted to ride upon the belly of the loops of film in said projector to automatically release said shutter to close off the source of light to the film in the projector, and means in said electrical means for shutting off the operating means of said projector.

6. The combination of, a motion picture projector, an inspection door therein, means for carrying a film through said projector, a light shutter, means for normally holding said shutter open, means controlled by said film for instantly closing said shutter, and means operable by the opening of said inspection door to reopen said shutter.

CARL F. LICK.